United States Patent [19]

Ishii et al.

[11] Patent Number: 4,908,700
[45] Date of Patent: Mar. 13, 1990

[54] DISPLAY CONTROL APPARATUS FOR DISPLACING AND DISPLACING COLOR IMAGE DATA

[75] Inventors: Takatoshi Ishii; Kazuya Kishioka, both of Tokyo, Japan

[73] Assignee: Ascii Corporation, Tokyo, Japan

[21] Appl. No.: 100,590

[22] Filed: Sep. 24, 1987

[30] Foreign Application Priority Data

Sep. 29, 1986 [JP] Japan ................................ 61-230953

[51] Int. Cl.$^4$ ............................................. H04N 9/75
[52] U.S. Cl. ...................................... 358/22; 358/183
[58] Field of Search .................. 340/703, 747; 358/22, 358/183

[56] References Cited

U.S. PATENT DOCUMENTS

| | | | |
|---|---|---|---|
| 4,149,184 | 4/1979 | Giddings et al. | 358/22 |
| 4,249,212 | 2/1981 | Ito et al. | 358/22 |
| 4,258,385 | 3/1981 | Greenberg et al. | 358/316 |
| 4,396,939 | 8/1983 | Kitahama | 358/22 |
| 4,498,098 | 2/1985 | Stell | 358/22 |
| 4,525,736 | 6/1985 | Korman | 358/28 |
| 4,639,721 | 1/1987 | Eto et al. | 340/747 |
| 4,682,297 | 7/1987 | Iwami | 358/183 |
| 4,697,176 | 9/1987 | Kawakami | 340/703 |

Primary Examiner—John W. Shepperd
Attorney, Agent, or Firm—Hoffmann & Baron

[57] ABSTRACT

A display control apparatus is provided in which the moving image of an object is successively compounded with a color picture image from an external source, so as to obtain a compounded image in which the resulting image of the object appears to be moving with respect to the color picture image. The display control apparatus of the present invention includes a register unit for storing color range selecting data therein and circuitry for selecting one of first color image data corresponding to signals which are supplied from an external device, e.g. television camera, and second color image data read from a video memory, e.g. a video random access memory (VRAM). Using data comparison circuitry, the value of color image data selected by the selection circuitry, is compared with the value of the color range selecting data stored in the register unit. Based on the comparison result of the comparator circuitry, either the first color image data or second color image data is selected using a data selector. Data rewriting circuitry is also provided for displacing, i.e. successively rewriting, the second color image data in the video memory, by the first color image data. The data selector supplies the selected color image data to a D/A converter in which color image data to be displayed are converted into predetermined analog image signals. These analog image signals are then supplied to an external display device on which a color image corresponding to the analog image signals is displayed on the screen thereof.

1 Claim, 5 Drawing Sheets

DISPLAY CONTROL APPARATUS FOR DISPLACING AND DISPLACING COLOR IMAGE DATA

BACKGROUND OF THE INVENTION

1. Field of the Invention

The present invention generally relates to display control apparatuses, and more particularly to a display control apparatus in which images are displayed on a screen thereof under a control of a central processing unit (CPU).

2. Prior Art

Figure 1:
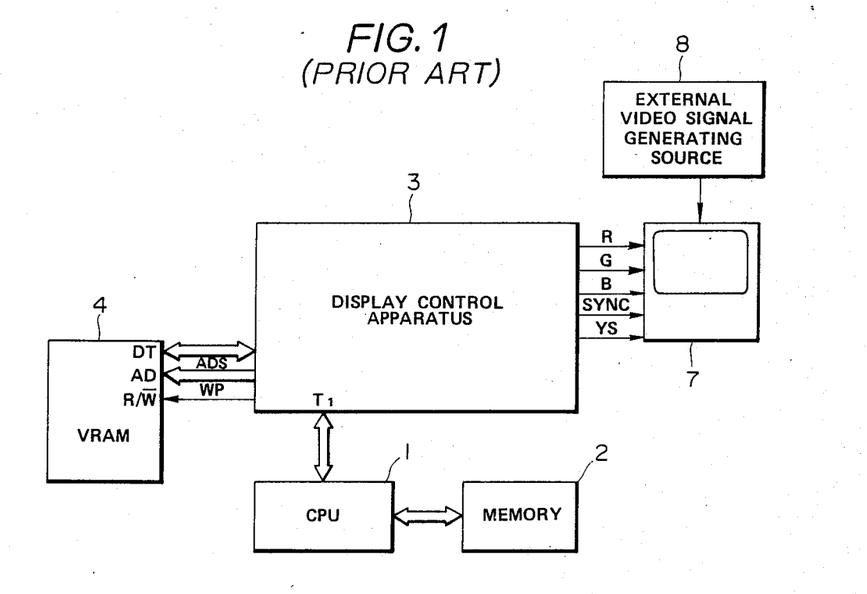
FIG. 1 is a block diagram showing an example of the conventional display apparatus.

Recently, a display apparatus shown in FIG. 1 is used as a terminal unit of the so-called captain system concerning a new media system. In FIG. 1, 1 designates a central processing unit (CPU), 2 designates a memory constituted by a read only memory (ROM) and a random access memory (RAM). The ROM stores programs used in the CPU 1, and the RAM stores data. In addition, 3 designates a display control apparatus, 4 designates a video random access memory (VRAM), 7 designates a CRT display unit, and 8 designates a video signal generating source such as a video tape recorder (VTR) or a television camera or the like. The VRAM 4 stores color codes each corresponding to each display dot on a screen of the CRT display unit 7. These color codes are read from the VRAM 4 in parallel based on address data ADS, and read color codes are supplied to the display control apparatus 3. On the other hand, the display control apparatus 3 writes the color codes supplied from the CPU 1 into the VRAM 4. When the CPU 1 outputs a display command to the display control apparatus 3, the display control apparatus 3 outputs the address data AD to the VRAM 4 so as to sequentially read the color codes from the VRAM 4 in parallel. Next, the display control apparatus 3 converts the color codes into analog signals, such as a red signal R, a green signal G and a blue signal B. The display control apparatus outputs these analog signals with a synchronizing signal SYNC to the CRT display unit 7. Thus, a color dot pattern (hereinafter, referred to as a VRAM image) corresponding to the color codes stored in the VRAM 4 is displayed on the screen of the CRT display unit 7.

Figure 2A:
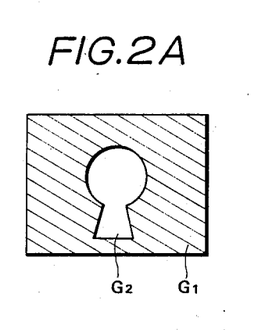
FIGS. 2A and 2B show images displayed on the screen of the display unit for explaining a compounding method of images.
Figure 2B:
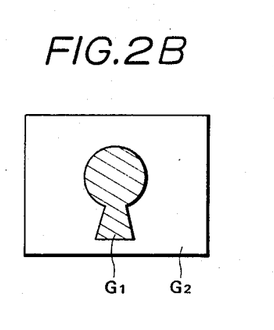

In the case where the color code read from the VRAM 4 represent a transparent color, the display control apparatus 3 outputs a signal YS to a YS terminal (not shown) of the CRT display unit 7. At this time, the CRT display unit 7 displays an image (hereinafter, referred to as an external image) corresponding to a composite color video signal from the external video signal generating source 8, instead of the VRAM image. As shown in FIG. 2A, an external image G2 is inserted into a partial area of a VRAM image G1 (corresponding to an area within the VRAM 4 in which transparent color codes are written), for example. Or, as shown in FIG. 2B, the VRAM image G1 is inserted into a partial area of the external image G2.

Figure 3:
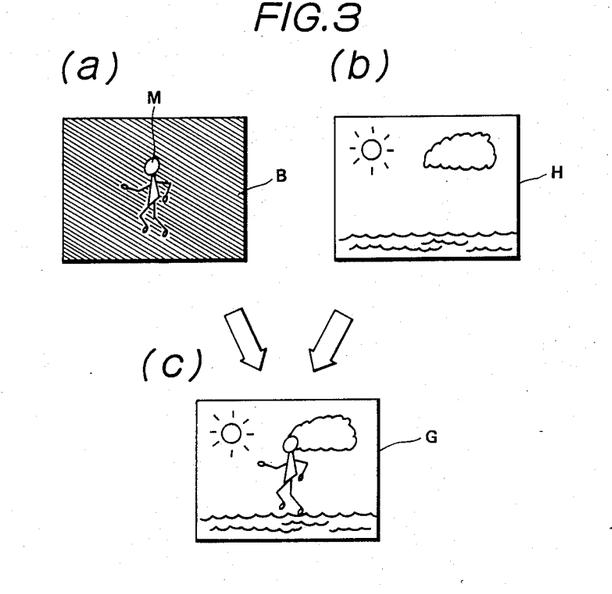
FIGS. 3(a) to 3(c) show images displayed on the screen of the conventional display apparatus shown in FIG. 1 for explaining the chromakey operation.

Meanwhile, the conventional display apparatus uses an image compounding technique such as a so-called chromakey in a television broadcasting industries. Next, description will be given with respect to a basic principle of the chromakey. First, a first television camera picks up an image of a man M who stands up in front of a blue background B, as shown in FIG. 3(a). The blue color is a complementary color of a skin color of the man M and a hue difference between the blue color and the skin color is quite large, hence, the color of the background B is determined to the blue color. Next, a circuit called "chromakeyer" (not shown) detects a difference between color signals corresponding to respective colors of the background B and the man M. This circuit drives a gate signal generator (not shown). Based on a first gate signal outputted from the gate signal generator, a signal corresponding to the background B is removed from an image signal outputted from the first television camera so that a first image signal only corresponding to the man M can be obtained. Next, a second television camera picks up an image of a background H only, as shown in FIG. 3(b). Based on a second gate signal inverse to the first gate signal, a signal corresponding to the man M is removed from the an image signal outputted from the second television camera so as to obtain a second image signal corresponding to an image in which an area of the man M is extracted from the background H.

The above first and second image signals are compounded together in a compounding amplifier (not shown), whereby a compounded image G (shown in FIG. 3(c) can be obtained.

Recently, the display apparatus is required to provide several kinds of specific display functions. One of these specific display functions is the chromakey function described above. Even the conventional display apparatus (shown in FIG. 1) can obtain an effect similar to the chromakey effect. More specifically, as shown in FIG. 2B, an animation image of the man (i.e., the VRAM image G1) can be inserted into the background image (i.e., the external image G2). In this case, only the transparent color codes can determine an extracting area of the VRAM image G1. Hence, the conventional display apparatus suffers a problem in that the chromakey function must be limited by large extent because the extracting area can not be determined by the color codes representing colors other than the transparent color. In addition, the VRAM image G1 stored in the VRAM 4 must be always identified as a reference image when the images are compounded. Hence, it is impossible for the conventional display apparatus to extract a red color portion from the external image G2 and insert such red color portion into the VRAM image G1. In this case, it can be easily thought out that the composite video signal is converted into a digital signal and an operational process is performed on the digital signal so as to extract the required portion (such as the above red color portion). However, when the above-mentioned process is performed by use of a software, the conventional display apparatus suffers another problem in that a processing time of the CPU 1 must become longer.

SUMMARY OF THE INVENTION

It is therefore a primary object of the invention to provide a display control apparatus in which it is possible to perform the chromakey operation by arbitrarily selecting the extracting area within the VRAM image and the external image by every hue (i.e., by every color such as red, green or blue color) and by every lightness.

It is another object of the invention to provide a display control apparatus in which it is possible to perform the chromakey operation with extremely high speed by not using a software process of the CPU.

According to one of the broader aspects of the present invention, there is provided a display control apparatus comprising: (a) register means for storing color range selecting data therein; (b) means for selecting one of first color image data corresponding to signals which are supplied from a external device and second color image data read from a video memory; (c) comparator means for comparing the value of color image data selected by the means with the value of the color range selecting data stored in the register means; and (d) selecting means for selecting one of the first color image data and the second color image data based on a comparing result of the comparator means, the selecting means supplying the selected color image data to the converter means.

According to another aspect of the present invention, a display control apparatus is provided in which color image data to be displayed are converted into predetermined analog image signals by D/A convertor means, and the analog image signals are supplied to an external display means wherein the color images corresponding to the analog image signals are displayed on the screen thereof. In general, the display control apparatus comprises a register means for storing color range selecting data therein, and means for selecting one of first color image data corresponding to signals which are supplied from an external device (e.g., television camera) and a second color image data read from a video memory (e.g. VRAM). The display control apparatus also includes a comparator means for comparing the value of color image data selected by the means, with the value of the color range selecting data stored in the register means. A selection means is provided for selecting one of the first color image data and the second color image data based on the comparing result of the comparator means. Rewriting means is also provided for displaying the second color image data by the first color image data, and the selection means supplies the selected color image data to the D/A convertor means. With such a video image memory (e.g. VRAM) rewriting capability, a moving image of an object (e.g. man) can be successively compounded with a color picture image. This successive compounding process is achieved using the moving image of the object to perform a color stripping effect on the color picture image supplied from the external device, in order to obtain a compounded image where moving images of the object are successively compounded with the color picture image, where such movement is in a particular direction on the display screen.

BRIEF DESCRIPTION OF THE DRAWINGS

Further objects and advantages of the present invention will be apparent from the following description, reference being had to the accompanying drawings wherein a preferred embodiment of the present invention is clearly shown.

In the drawings.

DESCRIPTION OF THE PREFERRED EMBODIMENT

Figure 4A:
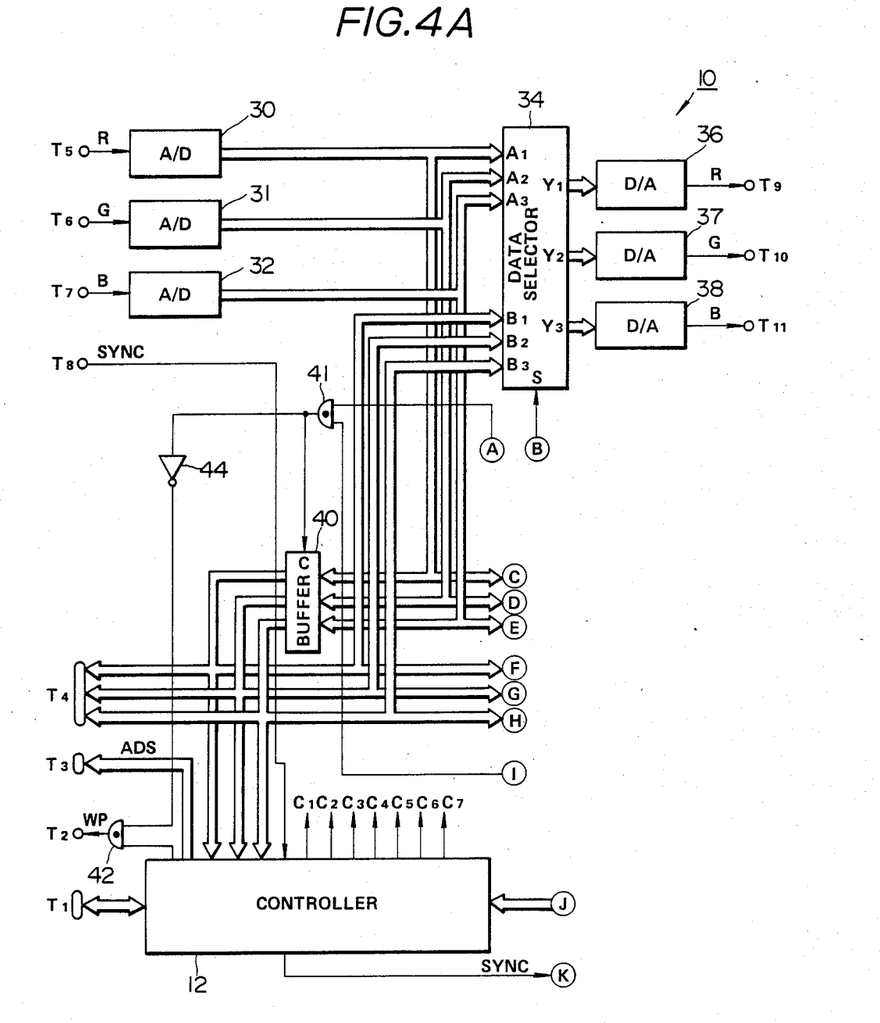
FIGS. 4A and 4B are block diagrams showing an embodiment of the display control apparatus according to the present invention.
Figure 4B:
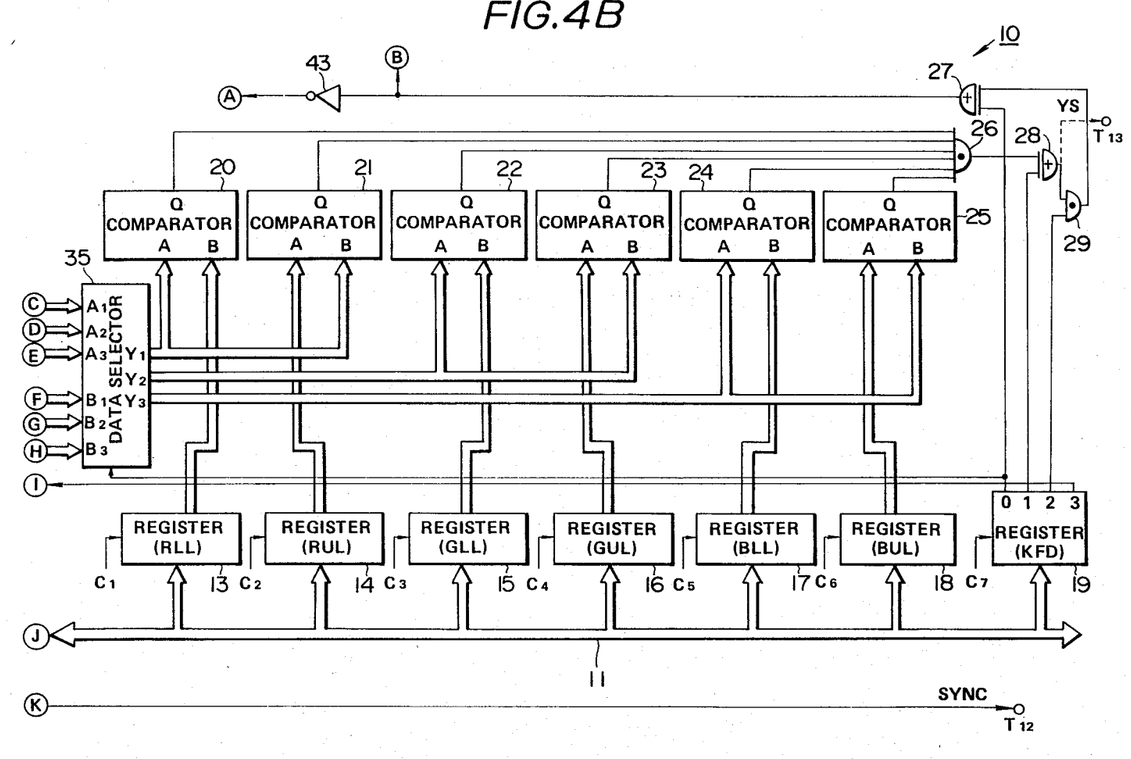
Figure 5:
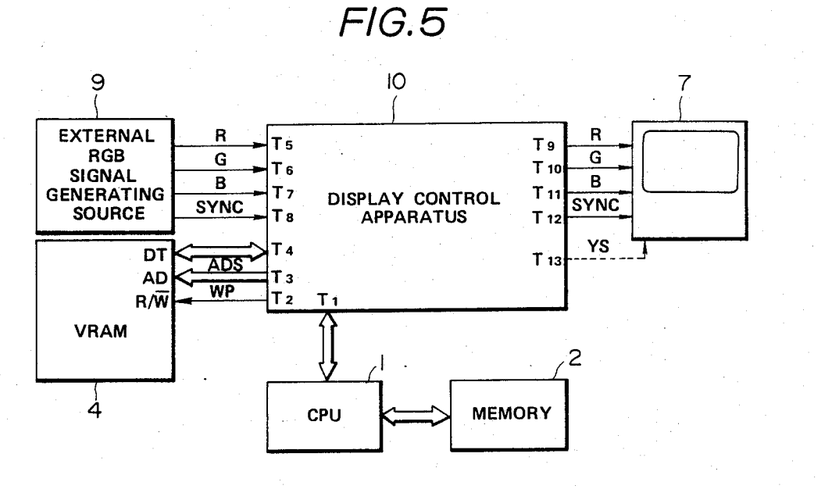
FIG. 5 is a block diagram showing an embodiment of the display apparatus which employs the display control apparatus according to the present invention.

Referring now to the drawings, wherein like reference characters designate like or corresponding parts throughout the several views, FIGS. 4A and 4B are block diagrams showing an embodiment of the display control apparatus 10 according to the present invention. FIG. 5 is a block diagram showing an embodiment of the display apparatus which employs the display control apparatus 10 shown in FIGS. 4A and 4B.

Similar to the conventional display apparatus shown in FIG. 1, the present display apparatus shown in FIG. 5 is constituted by the display control apparatus 10, the CPU 1, the memory 2, VRAM 4, the CRT display unit 7 and an external RGB signal generating source 9. This external RGB signal generating source 9 is constituted by the VTR or the color television camera, and the external RGB signal generating source 9 supplies analog signals R, G and B and a synchronizing signal SYNC to the display control apparatus 10. In the present embodiment, the VRAM 4 stores red (R) color data, green (G) color data and blue (B) color data (each constituted by data of four bits), each of which corresponds to each display dot on the screen of the CRT display unit 7.

Hereinafter, detailed description will be given with respect to the display control apparatus 10 in conjunction with FIGS. 4A and 4B.

[A] CONSTITUTION OF THE DISPLAY CONTROL APPARATUS 10

In FIGS. 4A and 4B, 11 designates an internal bus which is connected to a bus line (not shown) of the CPU 1 (shown in FIG. 5) via a controller 12. In addition, 13 to 18 designate registers, each of which is written with hue/lightness selecting data of four bits. This hue/lightness selecting data are set by every hue. More specifically, the hue/lightness selecting data include red lightness lower limit data RLL, red lightness upper limit data RUL, green lightness lower limit data GLL, green lightness upper limit data GUL, blue lightness lower limit data BLL and blue lightness upper limit data BUL, and these data RLL, RUL, GLL, GUL, BLL and BUL of four bits are supplied respectively to the registers 13 to 18.

In addition, 20 to 25 designate comparators, each of which compares first data supplied to an input terminal A thereof with second data supplied to an input terminal B thereof. When the value of the first data is larger than or equal to that of the second data, each comparator outputs a signal having logical level "1" (hereinafter, referred to as "1" signal) from an output terminal Q thereof. In this case, the register 13 supplies the red lightness lower limit data RLL are supplied to the input terminal B of the comparator 20, the register 14 supplies the red lightness upper limit data RUL to the input terminal A of the comparator 21, the register 15 supplies the green lightness lower limit data GLL to the input terminal B of the comparator 22, the register 16 supplies the green lightness upper limit data GUL to the input terminal A of the comparator 23, the register 17 supplies the blue lightness lower limit data BLL to the input terminal B of the comparator 24, and the register 18 supplies the blue lightness upper limit data BUL to the input terminal A of the comparator 25.

Furthermore, 26 designates an AND gate which outputs a logical product of the output signals of the comparators 20 to 25; 27 and 28 designates exclusive OR gates; 29, 41 and 42 designate AND gates; and 43 and 44 designate inverters.

In analog-to-digital (A/D) converters 30, 31 and 32, the analog signals R, G and B supplied from the external RGB signal generating source 9 are converted into first R color data, first G color data and first B color data, each of which are constituted by data of four bits. These first R, G and B color data are supplied respectively to input terminals $A_1$, $A_2$ and $A_3$ of a data selector 34 and input terminals $A_1$, $A_2$ and $A_3$ of a data selector 35. On the other hand, second R color data, second G color data and second B color data read from the VRAM 4 are supplied respectively to input terminals $B_1$, $B_2$ and $B_3$ of the data selector 34 and input terminals $B_1$, $B_2$ and $B_3$ of the data selector 35.

When a signal having logical level "0" (hereinafter, referred to as a "0" signal) is supplied to select terminals S of the data selectors 34 and 35, the first R, G and B color data outputted from the A/D converters 30, 31 and 32 are selected and such selected first R, G and B color data are outputted from output terminals $Y_1$, $Y_2$ and $Y_3$ thereof. On the other hand, when the "1" signal is supplied to the select terminals of the data selector 34 and 35, the second R, G and B color data outputted from the VRAM 4 are selected and such selected second R, G and B color data are outputted from output terminals $Y_1$, $Y_2$ and $Y_3$ thereof.

Next, digital-to-analog (D/A) converters 36 to 38 are supplied with the first or second R, G and B color data outputted from the output terminals $Y_1$, $Y_2$ and $Y_3$ of the data selector 34. These D/A converters 36 to 38 convert the R, G and B color data outputted from the data selector 34 into the corresponding analog signals R, G and B, and these analog signals R, G and B are outputted to the CRT display unit 7. In addition, the R color data outputted from the output terminal $Y_1$ of the data selector 35 are supplied to the input terminal A of the comparator 20 and the input terminal B of the comparator 21. Similarly, the G color data outputted from the output terminal $Y_2$ of the data selector 35 are supplied to the input terminal A of the comparator 22 and the input terminal B of the comparator 23. Furthermore, the B color data outputted from the output terminal $Y_3$ of the data selector 35 are supplied to the input terminal A of the comparator 24 and the input terminal B of the comparator 25.

In FIG. 4B, 19 designates a register written by key function data KFD of four bits outputted from the CPU 1. The key function data KFD are constituted by key select data, key polarity data, key on/off data and rewriting mode select data. The key select data are written into the 0-bit of the register 19, the key polarity data are written into the 1-bit of the register 19, the key on/off data are written into the 2-bit of the register 19 and the rewriting mode select data are written into the 3-bit of the register 19.

Firstly, the key select data determines whether a color stripping effect is worked on the color picture image corresponding to the data supplied from the external RGB signal generating source 9 or the data read from the VRAM 4. More specifically, the color picture image of the external RGB signal generating source 9 is selected when the value of the key select data is equal to "0", and the color picture image of the VRAM 4 is selected when the value of the key select data is equal to "1". Secondly, the key polarity data determines whether the color stripping effect is worked on an inner area designated by the hue/lightness selecting data RLL to RUL, GLL to GUL and BLL to BUL or the outer area thereof. More specifically, the inner area is selected when the value of the key polarity data is equal to "0", and the outer area is selected when the value of the key polarity data is equal to "1". Thirdly, the key on/off data determines whether the color stripping effect is worked or not. In this case, the color stripping effect is worked when the value of the key on/off data is equal to "1". Lastly, the rewriting mode select data determines whether a part of the R, G and B color data stored in the VRAM 4 is rewritten or not. When the value of the rewriting mode select data is equal to "1", the VRAM image rewriting mode (which will be described later) is selected.

The key select data outputted from the 0-bit of the register 19 are supplied to the select terminal S of the data selector 35 and a first input terminal of the exclusive OR gate 27. The key polarity data outputted from the 1-bit of the register 19 are supplied to a first input terminal of the exclusive OR gate 28. The key on/off data outputted from the 2-bit of the register 19 are supplied to a first input terminal of the AND gate 29. The rewriting mode select data outputted from the 3-bit of the register 19 are supplied to a first input terminal of the AND gate 41 (shown in FIG. 4A).

Meanwhile, the output signal of the AND gate 26 is supplied to a second input terminal of the exclusive OR gate 28. The output signal of the exclusive OR gate 28 is supplied to a second input terminal of the AND gate 29. The output signal of the AND gate 29 is supplied to a second input terminal of the exclusive OR gate 27. The output signal of the exclusive OR gate 27 is supplied directly to the select terminal S of the data selector 34 (shown in FIG. 4A). In addition the output signal of the exclusive OR gate 27 is inverted in the inverter 43, and such inverted signal is supplied to a second input terminal of the AND gate 41.

In FIG. 4A, the output signal of the AND gate 41 is supplied to the control terminal C of the buffer 40. I addition, the output signal of the AND gate 41 is inverted in the inverter 44, and such inverted signal is supplied to a first input terminal of the AND gate 42. When the "1" signal is supplied to the control terminal C of the buffer 40, the first R,G and B color data outputted from the A/D converters 30, 31 and 32 are supplied to the data terminal DT of the VRAM 4 via the buffer 40 and a terminal $T_4$ in series. In the case where the output level of the AND gate 41 is equal to "1", the "1" signal is inverted in the inverter 44, hence, the "0" signal is supplied to a first input terminal of the AND gate 42. Thus, the "0" signal is supplied to a read/write terminal R/W terminal of the VRAM 4 as a write signal WP.

The controller 12 controls all parts of the display apparatus (shown in FIG. 5). Next, description will be given with respect to the operations of the controller 12.

When the CPU 1 outputs write data of the VRAM 4 to a terminal $T_1$ of the controller 12, the controller 12 outputs such write data to the data terminal DT of the VRAM 4. At the same time, the controller 12 outputs the "0" signal to the second input terminal of the AND gate 42 so that the write signal WP is supplied to the read/write terminal R/W of the VRAM 4. In addition, the controller 12 outputs the address data ADS to an address terminal AD of the VRAM 4 via a terminal $T_3$, whereby the above write data are written in the VRAM 4.

On the other hand, when the CPU 1 outputs data to be written into the registers 13 to 19, the controller 12 outputs such data to the internal bus 11 and also outputs load signals $C_1$ to $C_7$ to the corresponding registers 13 to 19. The controller 12 provides a clock generator (not shown) therein which generates a clock pulse in synchronization with the synchronizing signal SYNC which is supplied from the external RGB signal generating source 9. When the CPU 1 supplies the display command to the controller 12, the controller 12 sequentially outputs the address data ADS at a timing based on the clock pulse outputted from the above clock generator. Based on the address data ADS, the R, G and B color data are sequentially outputted from the VRAM 4. At the same time, the controller 12 outputs the synchronizing signal SYNC to the CRT display unit 7.

[B] OPERATIONS OF THE DISPLAY CONTROL APPARATUS 10

(1) CASE I: COLOR STRIPPING EFFECT IS NOT EMPLOYED

In the case where the color stripping effect is not employed, the CPU 1 outputs data of "0000" as the key function data KFD. Such key function data KFD of "0000" are written into the register 19. Hence, the "0" signal at the 0-bit of the register 19 is supplied to the first input terminal of the exclusive OR gate 27. In addition, the "0" signal at the 2-bit of the register 19 is supplied to the first input terminal of the AND gate 29, hence, the "0" signal outputted from the AND gate 29 is supplied to the second input terminal of the exclusive OR gate 27. Thus, the two "0" outputted from the AND gate 29 is supplied to the second input terminal of the exclusive OR gate 27. Thus, the two "0" signals are supplied to both input terminals of the exclusive OR gate 27, so that the "0" signal outputted from the exclusive OR gate 27 is supplied to the select terminal S of the data selector 34.

Meanwhile, the CPU 1 outputs the display command to the controller 12. As described before, the controller 12 outputs the synchronizing signal SYNC, and the color data are sequentially read from the VRAM 4 in parallel under the control of the controller 12. The second R, G and B color data read from the VRAM 4 are supplied respectively to the output terminals $B_1$, $B_2$ and $B_3$ On the other hand, the analog signals R, G and B supplied from the external RGB signal generating source 9 are converted into the first R, G and B color data in the A/D converters 30, 31 and 32, and such first R, G and B color data are supplied respectively to the input terminals $A_1$, $A_2$ and $A_3$ of the data selector 34 and the input terminals $A_1$, $A_2$ and $A_3$ of the data selector 35 as well.

In this case, the exclusive OR gate 27 supplies the "0" signal to the select terminal S of the data selector 34. Hence, the data selector 34 selects the first R, G and B color data outputted from the A/D converters 30, 31 and 32, and the selected first R, G and B color data are supplied respectively to the D/A converters 36, 37 and 38 wherein the first R, G and B color data are converted into the analog signals R, G and B. Such analog signals R, G and B are supplied to the CRT display unit 7 via the terminals $T_9$, $T_{10}$ and $T_{11}$. Thus, the color picture image of the external RGB signal generating source 9 is displayed on the screen of the CRT display unit 7.

In the present state, when the CPU 1 outputs another key function data KFD of "1000" and such key function data KFD are written into the register 19, the "1" signal at the 0-bit of the register 19 is supplied to the first input terminal of the exclusive OR gate 27. At this time, the output level of the exclusive OR gate 27 turns up to the "1" level, and the "1" signal outputted from the exclusive OR gate 27 is supplied to the select terminal S of the data selector 34 wherein the second R, G and B color data read from the VRAM 4 are selected and such selected second R, G and B color data are supplied to the D/A converters 36, 37 and 38. As a result, the color picture image of the VRAM 4 is displayed on the screen of the CRT color display unit 7.

(2) CASE II: COLOR STRIPPING EFFECT IS WORKED ON COLOR PICTURE IMAGE OF EXTERNAL RGB SIGNAL GENERATING SOURCE 9

In the case where the color stripping effect is worked on the color picture image of the external RGB signal generating source 9, the CPU 1 sequentially outputs the hue/lightness selecting data RLL, RUL, GLL, GUL, BLL and BUL. These hue/lightness selecting data are sequentially written into the registers 13 to 18. Next, the CPU 1 outputs the key function data KFD. In the case where the color stripping effect is worked on the inner area designated by the hue/lightness selecting data, the CPU 1 outputs the key function data KFD of "0010". Such key function data KFD of "0010" are written into the register 19, whereby the "1" signal at the 2-bit of the register 19 is supplied to the first input terminal of the AND gate 29.

When the output level of the AND gate 26 is equal to the "0" level, both of the output levels of the exclusive OR gate 28 and the AND gate 29 are equal to the "0" level. Hence, the output level of the exclusive OR gate 27 turns to the "0" level, and the "0" signal is supplied to the select terminal S of the data selector 34. As a result, the data selector 34 selects the first R, G and B color data outputted from the A/D converter 30, 31 and 32, and the selected first R, G and B color data are supplied to the D/A converter 36, 37 and 38. On the other hand, the "0" signal at the 0-bit of the register 19 is supplied to the select terminal S of the data selector 35. Thus, the data selector 35 selects the first R, G and B color data, and the selected R, G and B color data are supplied to the predetermined input terminals A and B of the comparators 20 to 25 as described before.

As described before, other predetermined input terminals A and B of the comparators 20 to 25 are supplied with the red lightness lower limit data RLL, the red lightness upper limit data RUL, the green lightness lower limit data GLL, the green lightness upper limit data GUL, the blue lightness lower limit data BLL and the blue lightness upper limit data BUL which are outputted from the registers 13 to 18.

Therefore, the R color data outputted from the A/D converter 30 are supplied to the input terminal A of the comparator 20, and the red lightness lower limit data RLL are supplied to the input terminal B of the comparator 20. When the value of the R color data is equal to or larger than that of the red lightness lower limit data RLL, the comparator 20 outputs the "1" signal via the output terminal Q thereof.

Meanwhile, the R color data outputted from the A/D converter 30 are supplied to the input terminal B of the comparator 21, and the red lightness upper limit data RUL are supplied to the input terminal A of the comparator 21. When the value of the R color data is equal to or smaller than that of the red lightness upper limit data RUL, the comparator 21 outputs the "1" signal via the output terminal Q thereof.

Similarly, the comparator 22 compares the G color data (outputted from the A/D converter 31) with the green lightness lower limit data GLL, and the comparator 23 compares the G color data with the green lightness upper limit data GUL. In addition, the comparator 24 compares the B color data (outputted from the A/D converter 32) with the blue lightness lower limit data BLL, and the comparator 25 compares the B color data with the blue lightness upper limit data BUL. In the case where the area designated by the R, G and B color data outputted from the respective A/D converters 30, 31 and 32 enters into the inner area of the hue/lightness selecting data RLL to RUL, GLL to GUL and BLL to BUL, all of the comparators 20 to 25 output the "1" signals via the output terminals Q thereof.

In this case, the "1" signals outputted from the output terminals Q of the comparators 20 to 25 are supplied to the AND gate 26 wherein the output level thereof turns up to the "1" level, and the "1" signal outputted from the AND gate 26 is supplied to the second input terminal of the exclusive OR gate 28. At this time, the first input terminal of the exclusive OR gate 28 is supplied with the "0" signal outputted from the 1-bit of the register 19. Hence, the output level of the exclusive OR gate 28 turns up to the "1" level and the output level of the AND gate 29 turns up to the "1" level, so that the "1" signal outputted from the AND gate 29 is supplied to the second input terminal of the exclusive OR gate 27. For this reason, the output signal of the exclusive OR gate 27 becomes the "1" signal, and such "1" signal is supplied to the select terminal S of the data selector 34. As a result, the data selector 34 selects the second R, G and B color data of the VRAM 4 instead of the first R, G and B color data of the A/D converters 30, 31 and 32, and such selected second R, G and B color data are supplied to the D/A converters 36, 37 and 38.

In the above-mentioned state, when one of the comparators 20 to 25 outputs the "0" signal via the output terminal Q thereof (i.e., when the area designated by one color data within the R, G and B color data deviates from the corresponding area within the inner area of the hue/lightness selecting data RLL to RUL, GLL to GUL and BLL to BUL), the output level of the AND gate 28 is inverted. Hence, the output level of the exclusive OR gate 28 turns to the "0" level, the output level of the AND gate 29 turns to the "0" level, and the output level of the exclusive OR gate 27 turns to the "0" level. Thus, the data selector 34 selects the first R, G and B color data of the A/D converters 30, 31 and 32, and such selected first R, G and B color data are supplied to the D/A converters 36, 37 and 38.

Due to the above-mentioned operations, the area corresponding to a color range and a lightness range designated by the hue/lightness selecting data RLL, RUL, GLL, GUL, BLL and BUL is extracted from the color picture image of the external RGB signal generating source 9. Instead of the extracted area, the color picture image of the VRAM 4 is displayed on the screen of the CRT display unit 7.

For example, the external RGB signal generating source 9 outputs the analog signals R, G and B corresponding to the color picture image constituted by the images of the background B and the man M shown in FIG. 3(a), and the VRAM 4 stores the R, G and B color data corresponding to the color picture image of the background H shown in FIG. 3(b). In this case, the color range and the lightness range of the background B is selected by the hue/lightness selecting data RLL, RUL, GLL, GUL, BLL and BUL, and the key function data KFD are selected as the data of "0010", as described before. Thus, the background B is extracted from the color picture image of the external RGB signal generating source 9, and the background H of the VRAM 4 is selected instead of the extracted background B. As a result, the compounded image G as shown in FIG. 3(c) is displayed on the screen of the CRT display unit 7.

On the other hand, in the case where the color stripping effect is worked on the area outer to the area designated by the hue/lightness selecting data, the CPU 1 outputs the key function data KFD of "0110". Thus, the CRT display unit 7 displays a partial image corresponding to the color rang and the lightness range selected by the hue/lightness selecting data RLL, RUL, GLL, GUL, BLL and BUL on the screen thereof, and the color picture image of the VRAM 4 is displayed on the area other than the displayed area of the above partial image on the screen of the CRT display unit 7.

(3) CASE III: COLOR STRIPPING EFFECT IS WORKED ON COLOR PICTURE IMAGE OF VRAM 4

In the case where the color stripping effect is worked on the inner area designated by the hue/lightness selecting data within the color picture image of the VRAM 4, the CUP 1 outputs the key function data KFD of "1010". On the contrary, in the case where the color stripping effect is worked on the outer area of the hue/lightness selecting data within the color picture image of the VRAM 4, the CPU 1 outputs the key function data KFD of "1110". In both cases, the "1" signal at the 0-bit of the register 19 is supplied to the select terminal S of the data selector 35, whereby the data selector 35 always selects the second R, G and B color data of the VRAM 4 which will be supplied to the input terminals A or B of the comparators 20 to 25. In this case, the operations other than the above operation in which the second R, G and B color data are always selected as described above are similar to those of the CASE I and the CASE II described before, hence, the description thereof will be omitted.

(4) CASE IV: VRAM IMAGE REWRITING MODE

Figure 6:
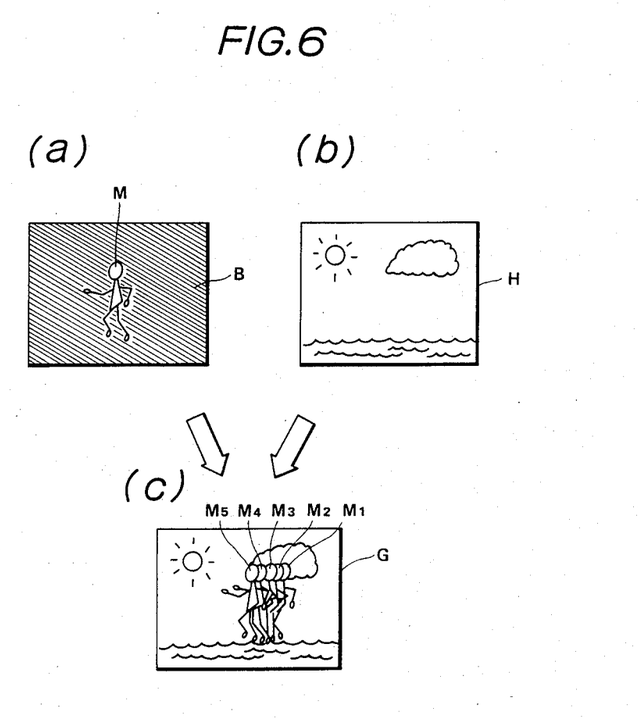
FIGS. 6(a) to 6(c) show images displayed on the screen of the display apparatus shown in FIG. 5 for explaining a compounding method of images in a VRAM image rewriting mode.

The VRAM image rewriting mode is the mode that the moving image of the man M is successively compounded so as to obtain a compounded image G shown in FIG. 6(c), for example. Next, description will be given with respect to the case where the VRAM image rewriting mode is performed and the color stripping effect is worked on the color picture image of the external RGB signal generating source 9 as described before in (2) CASE II.

As described before, the CPU 1 sequentially outputs the hue/lightness selecting data RLL, RUL, GLL, GUL, BLL and BUL. These hue/lightness selecting data are sequentially written into the registers 13 to 18. Thereafter, the CPU 1 outputs the key function data KFD.

In the case where the color stripping effect is worked on the inner area of the hue/lightness selecting data, the CPU 1 outputs the key function data KFD of "0011".

Such key function data KFD of "0011" are written into the register 19. Hence, the "1" signal at the 2-bit of the register 19 is supplied to the first input terminal of the AND gate 29, and the "1" signal at the 3-bit of the register 19 is supplied to the first input terminal of the AND gate 41. Thereafter, as described before, in the case where the area designated by the first R, G and B color data of the A/D converters 30, 31 and 32 enters into the area designated by the hue/lightness selecting data RLL to RUL, GLL to GUL and BLL to BUL, all of the comparators 20 to 25 output the "1" signals via the output terminal Q thereof. Thus, the output level of the AND gate 26 turns to the "1" level, the output level of the exclusive OR gate 28 turns to the "1" level, the output level of the AND gate 29 turns to the "1" level, and the output level of the exclusive OR gate 27 turns to the "1" level. Hence, the "1" signal is supplied to the select terminal S of the data selector 34. At this time, the data selector 34 selects the second R, G and B color data of the VRAM 4 instead of the first R, G and B color data of the A/D converters 30, 31 and 32, and such selected second R, G and B color data are supplied to the D/A converters 36, 37 and 38. In this case, the "0" signal outputted from the inverter 43 is supplied to the second input terminal of the AND gate 41, hence, the AND gate 41 outputs the "0" signal to the control terminal C of the buffer 40 and the inverter 44 as well. Thus, the inverter 44 outputs the "1" signal to the first input terminal of the AND gate 42. Meanwhile, the controller 12 outputs the read signal (i.e., the "1" signal) to the second input terminal of the AND gate 42, so that the AND gate 42 outputs the "1" signal. Therefore, the "1" signal is supplied to the read/write terminal R/W of the VRAM 4.

In the above-mentioned state, when the area designated by the first R, G and B color data (outputted from the A/D converters 30, 31 and 32) deviates from the area designated by the hue/lightness selecting data RLL to RUL, GLL to GUL and BLL to BUL, one of the comparators 20 to 25 outputs the "0" signal via the output terminal Q thereof. Hence, the output level of the AND gate 26 is inverted, and the "0" signal is supplied to the select terminal S of the data selector 34. At this time, the data selector 34 selects and outputs the first R, G and B color data to the D/A converters 36, 37 and 38. In this case, the "1" signal outputted from the inverter 43 is supplied to the second input terminal of the AND gate 41, hence, the AND gate 41 outputs the "1" signal to the control terminal C of the buffer 40 and the inverter 44. Thus, the first R, G and B color data are supplied to the data terminal DT of the VRAM 4 via the buffer 40. Meanwhile, the inverter 44 supplies the "0" signal to the first input terminal of the AND gate 42. Hence, the output level of the AND gate 42 becomes identical to the "0" level, regardless of that the controller 12 supplies the "1" signal to the second input terminal of the AND gate 42 as the read signal. For this reason, the read/write terminal R/W of the VRAM 4 is supplied with the "0" signal (i.e., the write signal WP), instead of the "1" signal. In this case, the controller 12 sequentially supplies the address data ADS to the address terminal AD of the VRAM 4. As a result, the R, G and B color data stored in the address to be originally read from the VRAM 4 are rewritten by the first R, G and B color data (outputted from the A/D converters 30, 31 and 32) in the VRAM 4.

For example, the external RGB signal generating source 9 sequentially outputs the analog signals R, G and B corresponding to the image of the background B (shown in FIG. 6(a) and the moving image of the man M who is moving in a left direction in FIG. 6(c), and the VRAM 4 pre-stored the R, G and B color data corresponding to the color picture image of the background H shown in FIG. 6(b). In addition, the color range and the lightness range of the background B are designated by the hue/lightness selecting data RLL, RUL, GLL, GUL, BLL and BUL, and the CPU 1 outputs the key function data KFD of "0011". Thus, the displayed image on the screen of the CRT display unit 7 represents the compounding image G where moving images $M_1$ to $M_5$ of the man M are successively compounded in the left direction on the screen as shown in FIG. 6(c). In this case, the content of the data stored in the VRAM 4 is successively rewritten in response to the compounding image G.

This invention may be practiced or embodied in still other ways without departing from the spirit or essential character thereof. For instance, the output signal YS of the exclusive OR gate 28 can be supplied to the CRT display unit 7 as shown by dotted lines in FIG. 4B and FIG. 5, whereby the image displayed on the screen of the CRT display unit 7 can be exchanged. Therefore, the preferred embodiment described herein is illustrative and not restrictive, the scope of the invention being indicated by the appended claims and all variations which come within the meaning of the claims are intended to be embraced therein.

What is claimed is:

1. A display control apparatus in which color image data to be displayed are converted into predetermined analog image signals by converter means and said analog image signals are supplied to external display means wherein a color image corresponding to said analog image signals is displayed on a screen thereof, said display control apparatus comprising:
   (a) register means for storing color range selecting data therein:
   (b) means for selecting one of first color image data corresponding to signals which are supplied from an external device and second color image data read from a video memory;
   (c) comparator means for comparing the value of color image data selected by said means with the value of said color range selecting data stored in said register means;
   (d) selecting means for selecting one of said first color image data and said second color image data based on a comparing result of said comparator means, said selecting means supplying the selected color image data to said converter means, and
   (e) rewriting means for displacing said second color image data by said first color image data.

* * * * *